Dec. 12, 1950     F. A. JENKS     2,533,262
CROSS POINTER FLIGHT INSTRUMENT
Original Filed May 26, 1943
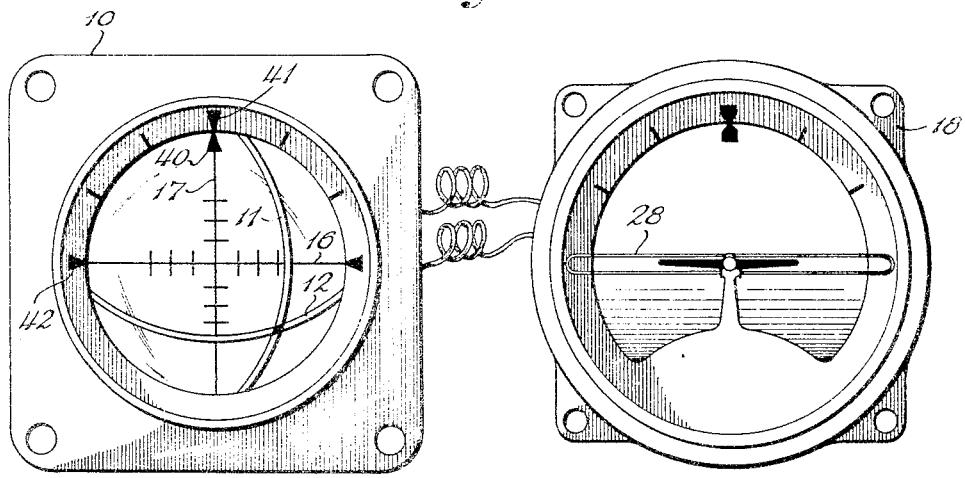
Fig. 1.
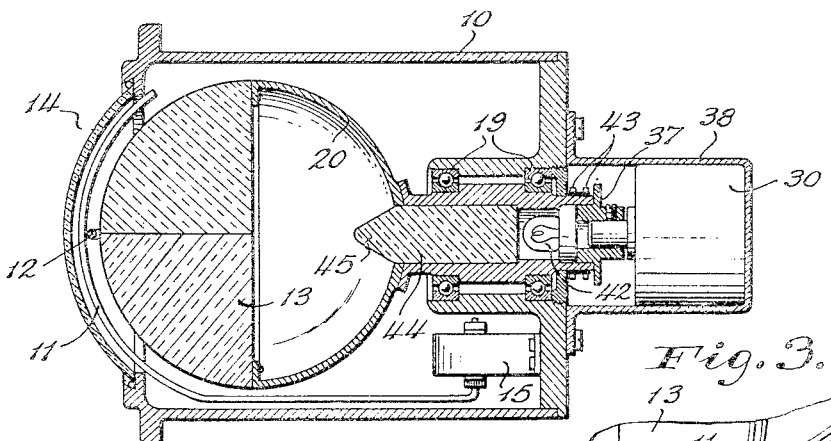
Fig. 2.
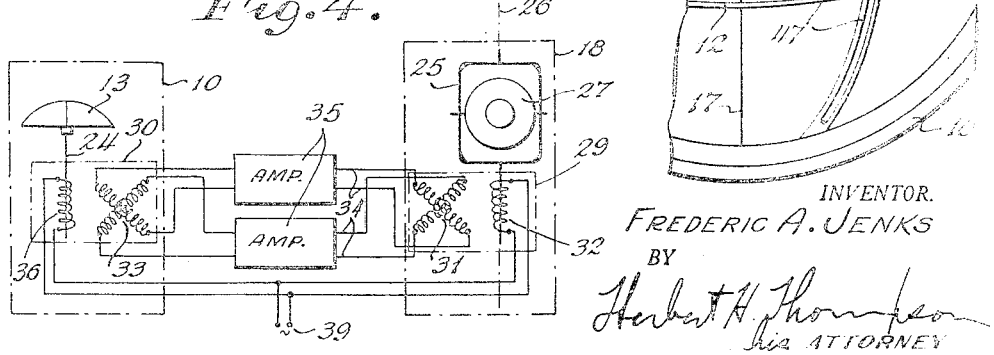
Fig. 3.
Fig. 4.
INVENTOR.
FREDERIC A. JENKS
BY
Herbert H. Thompson
his ATTORNEY Patented Dec. 12, 1950

2,533,262

UNITED STATES PATENT OFFICE 2,533,262

CROSS POINTER FLIGHT INSTRUMENT

Frederic A. Jenks, Rockville Centre, N. Y., assignor to The Sperry Corporation, a corporation of Delaware Original application May 26, 1943, Serial No. 488,618. Divided and this application March 11, 1947, Serial No. 733,809

7 Claims. (Cl. 88—65)

This invention relates to cross pointer meters of the character that are particularly useful in the navigation and instrument landing of dirigible craft.

More particularly, the present application is a division of my copending application Serial No. 488,618, filed May 26, 1943 for cross pointer meters, now Patent 2,424,570, July 29, 1947.

The present invention relates to the indicating features of the meter in which the pointers or arms of the meter include light polarizing material to provide an opaque index where the pointers cross. Another feature of the invention resides in the provision of a reference for the index of the meter that is formed of transparent or translucent material with an opaque scale thereon.

Other features and structural details of the invention will be apparent from the following description when read in relation to the accompanying drawing, wherein Fig. 1 is a front elevation of the improved meter and a similar view of a conventional artificial horizon;

Fig. 2 is a vertical cross-section of the meter instrument shown in Fig. 1;

Fig. 3 is an enlarged detail front view showing a modified form of the cross pointers; and Fig. 4 is a circuit diagram and schematic view showing the relation of the two instruments illustrated in Fig. 1.

With reference particularly to Figs. 1, 2 and 4, a cross pointer meter constructed in accordance with the present invention includes a housing 10 for the moving parts of the instrument which are provided by the elongated arms or crossed pointers 11 and 12 and a background element 13. The crossed arms 11 and 12 are mounted so that the same are free to move relatively to one another in mutually perpendicular relation as well as more relatively to the reference element 13. A window 14 in front of the housing 10 permits an observer to see the position of the crossed pointers relative to the element 13. A spring and coil combination is provided to position each of the movable pointers, only the combination 15 for pointer 11 being generally indicated in Fig. 2 in the present instance. The spring and coil combination, which are not illustrated in detail, may be of the character particularly shown and described in connection with D'Arsonval meter illustrated in Fig. 10–1 on page 354 of volume 1 of the book by John H. Morecroft and Frederick W. Hehre entitled "Electrical Circuits and Machinery" published in 1933 by John Wiley and Sons, Incorporated. The pointers are deflected in accordance with the strength of an applied electrical signal by the spring and coil actuating means which functions as a spring-opposed electromagnetic motor. The signal controlling the pointers may originate in a radio navigation control system (not shown) of the character described and illustrated in United States Letters Patent No. 2,395,854 to T. M. Ferrill, Jr.

The background element 13 employed is generally similar in character to the one shown in the hereinbefore noted patent and includes thereon a horizontal reference line 16 and a vertical reference line 17. Pointer 12 in connection with line 16 indicates up-down displacement of the craft from a given path. Also, pointer 11 in connection with line 17 indicates right-left displacement of the craft from the path. Lines 16 and 17 on element 13 provide a reference scale on which the position of the crossing portion of the two pointers 11 and 12 is observed. As shown, the element 13 may be formed in the shape of a spherical segment, the pointers may be arcuately shaped and the lines 16 and 17 on the reference may be graduated or scaled by short intersecting lines to provide an indication of the degree of displacement of the craft from the path.

As herein shown, the reference element 13 is mounted for pivotal movement with respect to housing 10 as the craft moves or turns about its roll axis by means of bearings 19. To provide stabilization of the element 13 of the meter with regard to the roll axis of the craft on which the meter is mounted, I employ in this instance, a gyro vertical in the form of an artificial horizon generally indicated at 18.

As illustrated in Fig. 2, element 13 may be mounted on a reflector 20 by suitable connecting means. Reflector 20 is provided with a hollow projecting end sleeve 22 that journals in the bearings 19 in the housing. It will be understood that the provided axis of movement of the element 13 is situated in parallel or aligned relation to the fore and aft axis of the craft on which the meter is mounted. This axis is indicated generally at 24, in Fig. 4.

With reference to Fig. 4, the conventional artificial horizon 18 may include a gimbal ring 25 whose axis 26 is parallel to axis 24. A gyro rotor bearing case 27 is mounted for pivotal movement in the usual manner on ring 25. As well understood in the art, if the craft banks about its roll or fore and aft axis, movement thereof with reference to axes 26 and 24 results, and in the artificial horizon instrument 18 a bank indication is provided by relative angular displacement between the reference 28 of the horizon and its associated stationary index 29', Fig. 1. The means provided, in the present instance, to stabilize the element 13 is the gyro vertical of the artificial horizon 18 and a self-synchronous position repeating system linking the same with the meter and including an electrical data transmitter 29 and an electrical data receiver 30. The stator 31 of the transmitter 29 is situated at the gyro vertical and the rotor 32 thereof is positioned relatively to the stator 31 by connection of the same to the gimbal ring 25. Stator 33 of the receiver 30 positioned in the housing 10 of the meter is connected to receive the output signal of the transmitter 29 by way of leads 34 through the amplifiers 35. Rotor 36 of the receiver 30 is connected to the sleeve 32 by a coupling 37, Fig. 2. As shown in Fig. 2, the receiver 30 is fixedly mounted in a casing 38 forming an extension at the rear of the meter instrument housing 10. The rotors 32 and 36 of the repeating system are supplied with energy from a common source of alternating current generally indicated at 39. The electrical system shown functions as a position repeating device that stabilizes the element 13, the transmitter thereof being situated at the roll axis of the gyro vertical and the receiver thereof being situated at the axis of the element 13.

Heretofore when making instrument landings with a cross pointer meter, the sense of bank of the craft was supplied by an auxiliary instrument such as an artificial horizon or bank-turn indicator. This information had to be obtained by occasional glances at the auxiliary instrument, thereby causing the pilot's attention to be momentarily removed from the cross pointer meter. This requirement is distinctly disadvantageous, particularly when the craft is in the final stages of landing. With the improved meter a bank sense is obtained directly from the orientation of the element 13 in the instrument landing cross pointer meter so that it is unnecessary for the pilot to divert his attention from the single instrument at any stage in the landing of the craft. In this connection, the background element 13 of the meter provides a bank indicating reference 40 thereon which cooperates with an index 41 located on the housing 10 of the instrument.

As shown, a further bank indication may be provided by the spaced indices 42 on the housing and by the line 16 of the element 13. If desired, the background element may be constructed in two equally sized sections of different degrees of translucency to define the bank line 16 thereon. The portion of the element above the line 16 may be a light amber translucent material while that below the line may be a dark amber translucent material. With illumination supplied to the element 13 from the rear, the upper portion thereof simulates the sky and the lower portion simulates the earth so that when the craft banks, the meter will apparently indicate such condition relative to the earth instead of to an artificial line. Means for illuminating the element 13 is provided by a lamp 42 situated within the sleeve 22. Lamp 42 is energized from a suitable source (not shown) by way of slip rings 43. Light from the lamp 42 is communicated to the reflector 20 by way of a light guiding rod 44 fitting in the sleeve 22 whose end is shaped to provide uniform illumination of the reflector 20, as indicated at 45. Element 13 may be formed of transparent or translucent material having opaque lines 16 and 17 or scales thereon.

In the improved instrument, the cross pointers or arms 11 and 12 are made of light polarizing and preferably translucent material whose respective polarizing planes are arranged in mutually perpendicular relation to provide a uniformly opaque index where the arms cross readable on the reference element, as shown in Fig. 1. In the modification of the invention shown in Fig. 3, the respective pointers 11 and 12 are longitudinally slotted as indicated at 47. This type of polarized pointer may be employed when the cross pointer reference lines 16 and 17 are graduated or scaled to indicate the approximate displacement of the craft from the path.

Preferably, the rear of element 13 may be frosted to create the impression that the observer is looking into the instrument instead of looking at it. The rod 44 may be formed of a plastic material that is transparent or translucent.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. An indicating meter of the cross pointer type comprising a transparent element having an opaque reference thereon, a pair of elongated arms movable relatively to one another in mutually perpendicular relation and movable relatively to the reference element, said arms being made of light polarizing translucent material whose respective polarizing planes are arranged in mutually perpendicular relation to provide a uniformly opaque index where the arms cross readable on the reference element, and means for illuminating said element and arms.

2. A meter as claimed in claim 1, in which the element is translucent.

3. A meter as claimed in claim 1, in which the opaque reference is two mutually perpendicular lines.

4. A meter as claimed in claim 1, in which the opaque reference is two mutually perpendicular lines and the arms are slotted longitudinally.

5. In an indicating meter of the cross pointer type, a pair of elongated arms movable relatively to one another in mutually perpendicular relation, said arms being made of light polarizing material whose respective polarizing planes are arranged in mutually perpendicular relation to provide a uniformly opaque index where the same cross, means operable to move one of said arms, and means operable to move the other of said arms.

6. In an indicating meter of the cross pointer type, a pair of elongated arms movable relatively to one another in mutually perpendicular relation, said arms being made of light polarizing material whose respective polarizing planes are arranged in mutually perpendicular relation to provide a uniformly opaque index where the same cross.

7. An indicating meter of the cross pointer type adapted to be mounted vertically on an instrument panel comprising a translucent spherical segment having references thereon, a pair of arcuate arms pivoted behind said segment on normally vertical and horizontal axes and movable relatively to one another in mutually perpendicular relation and movable around the face of the spherical segment, said arms being made of light polarizing material whose respective polarizing planes are arranged in substantially perpendicular relation to provide an opaque index where the arms cross readable on said references, and means for illuminating said segment and arms from behind.

FREDERIC A. JENKS.

REFERENCES CITED

The following references are of record in the file of this patent:

UNITED STATES PATENTS

| Number | Name | Date |
|---|---|---|
| 1,272,396 | Dixon et al. | July 16, 1918 |
| 2,122,225 | Wheelwright, 3d. | June 18, 1938 |
| 2,123,743 | Pratt | July 12, 1938 |
| 2,165,974 | Land | July 11, 1939 |
| 2,264,726 | Stickney | Dec. 2, 1941 |
| 2,280,297 | Neumueller et al. | Apr. 21, 1942 |
| 2,395,718 | Bradley | Feb. 26, 1946 |
| 2,424,570 | Jenks | July 29, 1947 |

FOREIGN PATENTS

| Number | Country | Date |
|---|---|---|
| 632,747 | Germany | Nov. 15, 1933 |